United States Patent [19]

Treybig et al.

[11] Patent Number: 4,784,796
[45] Date of Patent: Nov. 15, 1988

[54] CORROSION INHIBITORS

[75] Inventors: Duane S. Treybig, Lake Jackson; Terry W. Glass, Clute, both of Tex.

[73] Assignee: The Dow Chemical Company, Midland, Mich.

[21] Appl. No.: 56,614

[22] Filed: May 29, 1987

Related U.S. Application Data

[63] Continuation-in-part of Ser. No. 782,653, Oct. 1, 1985, abandoned, which is a continuation-in-part of Ser. No. 594,518, Mar. 29, 1984, abandoned.

[51] Int. Cl.$^4$ .......... C23F 11/14; C09K 7/00; C25F 11/04; C04B 9/02
[52] U.S. Cl. .................... 252/392; 252/390; 252/8.555; 252/148; 106/14.13; 106/14.15; 106/14.16; 106/14.18; 422/12
[58] Field of Search .............. 252/390, 392, 8.555; 106/14.13, 14.15, 14.16, 14.18

[56] References Cited

U.S. PATENT DOCUMENTS

| | | | |
|---|---|---|---|
| 2,643,977 | 6/1953 | Hughes | 252/8.555 |
| 2,643,978 | 6/1953 | Hughes | 252/8.555 |
| 2,727,003 | 12/1955 | Hughes | 252/8.555 |
| 2,769,783 | 11/1956 | Hollyday | 252/45 |
| 2,877,179 | 3/1959 | Hughes | 252/8.555 |
| 3,026,285 | 3/1962 | Hirosawa | 525/514 |
| 3,077,454 | 2/1963 | Monroe et al. | 252/148 |
| 3,432,574 | 3/1969 | Kamal | 524/451 |
| 3,459,710 | 8/1969 | Caiola et al. | 528/246 |
| 3,932,296 | 1/1976 | Byth | 252/392 X |
| 4,315,087 | 2/1982 | Redmore et al. | 252/392 X |
| 4,344,861 | 8/1982 | Levy | 252/391 |
| 4,614,600 | 9/1986 | Schilling et al. | 252/392 X |
| 4,701,484 | 10/1987 | Chang et al. | 524/59 |
| 4,725,373 | 2/1988 | Treybig et al. | 252/8.555 |
| 4,734,259 | 3/1988 | Frenier et al. | 422/16 |
| 4,740,320 | 4/1988 | Treybig et al. | 252/390 X |

Primary Examiner—Matthew A. Thexton
Assistant Examiner—Virginia Caress

[57] ABSTRACT

The reaction of an $\alpha,\beta$-ethylenically unsaturated aldehyde with organic amines which is further reacted with a carboxylic acid, organic halide or an epoxide-containing compound are employed as corrosion inhibitors for preventing corrosion of ferrous metals in contact with corrosive brine, oil and gas well fluids.

8 Claims, No Drawings

CORROSION INHIBITORS

CROSS REFERENCE TO RELATED APPLICATION

This application is a continuation-in-part of application Ser. No. 782,653 filed Oct. 1, 1985 (now abandoned) which is a continuation-in-part of application Ser. No. 594,518 filed Mar. 29, 1984 (now abandoned).

BACKGROUND OF THE INVENTION

The present invention relates to new and useful corrosion inhibitors and in particular to corrosion inhibitors which materially reduce the effects of attack of reactive materials on metals of construction.

In oil producing applications, metal tubing, sucker rods, valves, screens, coatings, pumps, and the like are subjected to the action of extremely corrosive fluids and gases. Such sweet and/or sour corrosive compositions can contain dissolved materials such as hydrogen sulfide, sulfur dioxide, carbon dioxide, oxygen, mineral acids, organic acids, and the like, as well as mixtures thereof.

Numerous processes for inhibiting the corrosion of metals caused upon exposure to corrosive oil and gas well fluids have been proposed. See, for example, U.S. Pat. Nos. 2,643,977 and 3,077,454. Unfortunately, such processes are not effective under the conditions of high temperatures and pressures experienced by metal equipment in extremely deep oil and gas wells. Such conventional corrosion inhibitors can have a tendency to degrade, volatilize, or polymerize causing formation damage and/or inadequate corrosion protection.

In view of the deficiencies of the prior art, it would be highly desirable to provide a corrosion inhibitor which is easily prepared and can be effectively employed under very high temperature and pressure conditions.

SUMMARY OF THE INVENTION

The present invention pertains to a new composition of matter which comprises the product resulting from reacting at a temperature of from about 25° C. to about 250° C. for a time sufficient to render the reaction complete as determined by halide or residual acid number titrations (I) the product resulting from reacting, in the presence or absence of a suitable solvent,
  (A) at least one aliphatic $\alpha,\beta$-monoethylenically unsaturated aldehyde having from about 3 to about 6 carbon atoms; and
  (B) at least one organic diamine represented by the formula

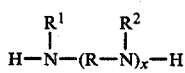

wherein R is a divalent saturated $C_2$ to $C_4$ aliphatic hydrocarbon group; each $R^1$ and $R^2$ is independently hydrogen or a saturated alkyl amino or an alkyloxy group containing from 2 to about 4 carbon atoms or when two adjacent R2 groups are taken together, they form a bridging alkylene radical containing 2 carbon atoms such that the R group containing 2 carbon atoms and two adjacent R2 groups and two nitrogen atoms form a heterocyclic ring containing 4 carbon atoms and 2 nitrogen atoms: x has a value from 1 to about 8 and wherein components (A) and (B) are employed in a mole ratio of (A) to (B) of from about 1:1 to about 1:6: and (II)
  (A) at least one saturated or unsaturated, cyclic or acyclic aliphatic mono- or polycarboxylic acid having from about 2 to about 50 carbon atoms; or
  (B) at least one saturated or unsaturated, cyclic or acyclic aliphatic alkyl monohalide or alkyl polyhalide having from about 2 to about 50 carbon atoms; or
  (C) a combination of (A) and (B);

wherein components (I) and (II) are employed in quantities which provide from about 0.4 to about 1, suitably from about 0.55 to about 0.85, more suitably from about 0.65 to about 0.75 equivalent of carboxyl and/or halide groups from component (II) for each theoretically active amino hydrogen atom contained in component (I).

The present invention provides corrosion protection to metal compositions exposed to corrosive fluids (gases and/or liquids) at high temperatures and pressures, such as are experienced in deep oil and gas wells, geothermal wells, brines and the like.

In another aspect, the present invention is a process for preventing the corrosion of a metal composition in contact with corrosive fluids, which process comprises contacting the surface of said metal composition with an effective amount of the aforementioned corrosion inhibitor.

DETAILED DESCRIPTION OF THE INVENTION

The corrosion inhibitors of the present invention can be prepared by conveniently conducting the reaction, quaternization or neutralization at temperatures from about 0° C. to about 300° C. The neutralization is preferably carried out at temperatures of from about 0° C. to about 100° C. while the reaction is preferably carried out at temperatures of from about 150° C. to about 250° C. and the quaternization reaction is preferably carried out at a temperature of from about 25° C. to about 250° C.

The $\alpha,\beta$-ethylenically unsaturated aldehydes useful herein can be generally represented by the formula:

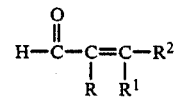

wherein each R, $R^1$ and $R^2$ are individually hydrogen, alkyl, aryl, aralkyl or substituted alkyl, aryl or aralkyl. Substituents include, for example, halo, alkoxy and amino groups. Examples of suitable $\alpha,\beta$-monoethylenically unsaturated aldehydes are disclosed in U.S. Pat. No. 3,459,710 which is incorporated herein by reference. Other such aldehydes include, for example, furfural, methyl acrolein, bromo- or chloro-cinnamaldehyde, and hexenal. The preferred $\alpha,\beta$-monoethylenically unsaturated aldehyde is acrolein or mixtures thereof with other aldehydes.

The organic polyamines of this invention can include those organic diamines of the type disclosed in the aforementioned U.S. Pat. No. 3,459,710. See also those polyamines disclosed in U.S. Pat. No. 4,292,413. Other polyamines include, for example, triethylenetetraamine, tetraethylenepentamine, pentaethylenehexamine, hexaethyleneheptamine, polyoxypropyleneamine, iminobispropylamine, 2-(2-aminoethylamino)ethanol, N-decyl-1,2-ethanediamine, N-undecyl-1,2-ethanediamine, N-tridecyl-1,2-ethanediamine, N-pentadecyl-1,2-ethanediamine, N-hexadecyl-1,2-ethanediamine, N-heptadecyl-1,2-ethanediamine, N-octadecyl-1,2-ethanediamine, N-decyl1,3-propanediamine, N-dodecyl-1,2-propanediamine, N-tetradecyl-1,3-propanediamine, N-hexadecyl-1,3-propanediamine, N-heptadecyl-1,3-propanediamine, N-octadecyl-1,2-propanediamine, N-octadecyl-1,3-propanediamine, octadecen-1,3-propanediamine, and the like as well as mixtures thereof. In addition, ammonia and monofunctional amines can be utilized. Monofunctional amines include 1-decanamine, 1-undecanamine, 1-dodecanamine, 1-tridecanamine, 1-tetradecanamine, 1-pentadecanamine, 1-hexadecanamine, 1-heptadecanamine, 1-octadecanamine, 9-octadecen-1-amine, 9,12-octadecadien-1-amine, 9,12,15-octadecatrien-1-amine, 9-eicosen-1-amine, tallow amine, cocoamine, diglycolamine, and the like. Of the foregoing polyamines, those polyamines containing at least one primary amine are preferred; with those polyamines capable of forming imidazolidine or hexahydropyrimidine moieties or substituted moieties thereof being most preferred. Polyamines can be ethoxylated, propoxylated, butoxylated or polyethoxylated, polypropoxylated or polybutoxylated. Preferred polyamines are ethylenediamine and propylenediamine.

Particularly suitable organic amines which can be employed in the present invention include those represented by the formulas

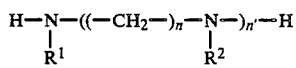

or

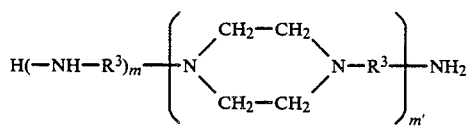

wherein each $R^1$ and $R^2$ is independently hydrogen or a hydrocarbyl group or hydroxyl substituted hydrocarbyl group or amine substituted hydrocarbyl group having from 1 to about 36, preferably from about 1 to about 3 carbon atoms, each $R^3$ is independently a divalent hydrocarbyl group having from 1 to about 36, preferably from 1 to about 3 carbon atoms; m has a value from zero to about 8, m' has a value from 1 to about 4, n has a value of 2 or 3 and n' has a value from about 1 to about 10. The term hydrocarbyl as employed herein means any aliphatic, cycloaliphatic, aromatic, aryl substituted aliphatic groups or aliphatic substituted aromatic groups.

The compounds comprising a functionality and/or functionalities (i.e. substituted groups) capable of undergoing a reaction, quaternization or neutralization with an amine include, for example, compounds comprising carboxylic acid moieties, organic halide moieties, epoxide moieties, and the like. For example, a carboxylic acid moiety can react with an amine to form a salt, amide or amidine-type linkage. Most preferably, substituent compounds include the polycarboxylic acids, organic polyhalides and polyepoxides. Such compounds are capable of introducing desired crosslinking to the product. Monocarboxylic acid compounds, organic monohalides and monoepoxide compounds can be employed. Examples of suitable carboxylic acids include acetic acid, benzoic acid, phthalic acid, terephthalic acid, myristic acid, palmitic acid, oleic acid, isostearic acid, capric acid, caprylic acid, lauric acid, tall oil fatty acids, 5-carboxy-4-hexyl-2-cyclohexene-1-octanoic acid, 6-carboxy-4-hexyl-2-cyclohexene-1-octanoic acid, dimer acids, trimer acids and similar mono- and polycarboxylic acids. Other suitable acids are disclosed in U.S. Pat. No. 4,339,349, which is incorporated herein by reference. Examples of suitable mono- and polyepoxides include dodecyloxirane, tetradecyloxirane, hexadecyloxirane, 2-decyl-3-hexyloxirane, 2,3-dioctyloxirane, octadecyloxirane, 2-decyl-3-(5-methylheptyl)oxirane, (dodecyloxy)methyl oxirane, (tetradecyloxy)methyl oxirane, epoxidized vegetable oils such as epoxidized linseed oil, epoxidized carboxylic acids such as epoxidized oleic acid, the glycidyl ethers, and the like. See U.S. Pat. No. 4,292,413 for representative epoxide compounds. Examples of suitable organic halides include 1-chlorodecane, 1-bromodecane, 1-bromoundecane, 1-bromododecane, 1-iodododecane, 1-chlorotetradecane, 1-bromotetradecane, 1-bromopentadecane, 1-chlorohexadecane, 1-bromohexadecane, 1-chlorooctadecane, 1-bromooctadecane, 1-iodooctanedecane, 2-bromododecane, 2-bromotridecane, 1,12-dibromododecane, 1,2-dibromohexadecane, 1,2-dibromooctadecane, benzyl chloride, benzyl bromide, p-dodecylbenzyl chloride, and the like. Other suitable organic halides are disclosed in U.S. Pat. No. 4,315,087, which is incorporated herein by reference. Other suitable compounds comprising a functionality or functionalities capable of undergoing a reaction, quaternization or neutralization with an amine include, for example, inorganic acids, aldehydes, alkylene oxides, cyanides, nitriles, sulfur containing compounds such as mercaptans, and the like. Preferably, the substituent compound has a predominantly hydrophobic character.

Suitable acetylenic alcohols which can be employed herein include, for example, 2-propyn-1-ol (propargyl alcohol), 2-butyn-1-ol, 3-butyn-1-ol, 3-butyn-2-ol, 2-methyl-3-butyn-1-ol, 2-methyl-3butyn-2-ol, 1-pentyn-3-ol, 3-pentyn-1-ol, 4-pentyn-2-ol, 3-hexyn-1-ol, 5-hexyn-1-ol, 3-ethyl-4-hexyn-3-ol, 5,5-dimethyl-2-hexyn-1-ol, 3-(2-methylpropyl)-5-hexyn-2-ol, 2,3,4,4-tetramethyl-5-hexyn-3-ol, 1-heptyn-3-ol, 5-heptyn-1-ol, 4-methyl-1-heptyn-4-ol, 6-methyl-2-heptyn-4-ol, 4-propyl-1-heptyn-4-ol, 1-octyn-3-ol, 1-octyn-4-ol, 2-octyn-1-ol, 4-octyn-3-ol, 7-octyn-1-ol, 7-methyl-2-octyn-1-ol,2-methyl-4-octyn-2-ol, 3-ethyl-5-octyn-3-ol, 4-ethyl-1-octyn-3-ol, 3,7-dimethyl-1-octyn-3-ol, 1-nonyn-3-ol, 3-nonyn-1-ol, 7-nonyn-1-ol, 1-decyn-3-ol, 2-decyn-4-ol, 9-decyn-4-ol, mixtures thereof and the like.

Suitable aliphatic and aromatic aldehydes which can be employed herein include, for example, formaldehyde, acetaldehyde, propanal, butanal, pentanal, 2-methylbutanal, hexanal, octanal, nonanal, decanal, undecanal, 2-methylundecanal, dodecanal, tridecanal, tetradecanal, octadecanal, benzaldehyde, 2-bromobenzaldehyde, 2-methoxybenzaldehyde, 2,3-dimethoxybenzaldehyde, benzeneacetaldehyde, 3-phenyl-2-propenal, 2-methyl-3-phenyl-2-propenal, 2-chloro-3-phenyl-2-propenal, 2-bromo-3-phenyl-2-propenal, 3,3-diphenyl- 2-propenal, 3-(2-nitrophenyl)-2-propenal, mixtures thereof and the like.

Products used in this invention are preferably prepared by first reacting the organic polyamine with the α,β-ethylenically unsaturated aldehyde. Preferably, the reaction is carried out in an inert atmosphere and at a temperature between about 0° C. and about 150° C. The choice of inert solvent is generally dependent upon the boiling point of the polyamine, the solubility of the polyamine and the solubility of the resulting polymer. Advantageously, the solvent is one in which both the monomers and resultant polymer are soluble. Suitable solvents include methanol, ethanol, isopropanol, butanol, benzene, water, dioxane, dimethylformamide, tetrahydrofuran, and the like.

Preferably nearly equimolar amounts of polyamine and unsaturated aldehyde are employed. Preferably, the organic polyamine is dissolved in a suitable solvent in a reaction vessel. A solution of the unsaturated aldehyde and suitable solvent is then contacted with the polyamine solution, preferably in a slow manner. The reaction mixture can be cooled or heated. Solvent can be removed by distillation. Preferably, a solvent, such as isopropanol can be added to the reaction mixture in order to create an azeotropic mixture for removing solvent and by-product.

Oligomer or polymer products obtained from the reaction of α,β-ethylenically unsaturated aldehydes with organic polyamines, usually have an average molecular weight less than about 1,000. The polymers or oligomers within the scope of this invention comprise compounds having one or more vinyl, imine, enamine, ether, or hydroxyl functional groups. The reaction of an amine containing piperazine rings with an α,β-ethylenically unsaturated aldehyde introduces piperazine rings into the constituents of the product. The reaction of the carbonyl of α,β-monoethylenically unsaturated aldehyde with a primary amine forms an imine which readily cyclizes if labile (where the term "labile" is as defined in U.S. Pat. No. 4,315,087) amine hydrogens are available, preferably in the γ (gamma) or δ (delta) position relative to the nitrogen of the imine. An imidazolidine ring is formed from the reaction of the carbonyl of an α,β-monoethylenically unsaturated aldehyde with an ethylenepolyamine while a hexahydropyrimidine ring is formed from the reaction of the carbonyl of an α,β-monoethylenically unsaturated aldehyde with a propylenepolyamine. Some of the possible constituents of the oligomers formed from the reaction of, for example, acrolein with ethylenediamine are believed to be represented by the following structures, although the authors do not wish to be limited by this theory:

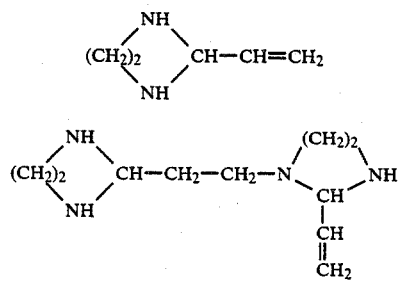

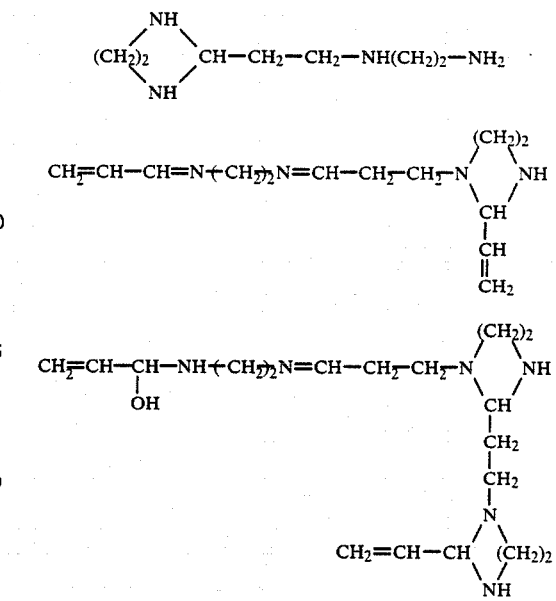

The product which is isolated can be contacted with the compound comprising a functionality or functionalities capable of undergoing a reaction, quaternization or neutralization with an amine. The previously described product is dissolved or dispersed in a suitable solvent and contacted with the substituent compound which is also dissolved in a suitable solvent. The amount of substituent compound which is employed can vary such that about 1 to about 100 percent of the available amino hydrogens of the polyamine/unsaturated aldehyde product can be reacted with reactive functionalites of the substituent compound. This resulting product can, if desired, be isolated using techniques such as distillation to remove by-products and solvent.

The resulting product can be employed as a corrosion inhibitor as are conventional corrosion inhibitors. Generally, the product can be employed in corrosion inhibitor formulations as are known in the art. For example, the product can be dispersed or dissolved in a suitable carrier liquid or solvent such as water, alcohols, aromatic and aliphatic hydrocarbons, and the like, or mixtures thereof. Other additives include demulsifiers, water wetting agents, surfactants, viscosifiers, commingled gases, defoamers, other corrosion inhibitors such as polymeric materials and salts, organic and inorganic acids, iron control agents, sequestering and/or chelating agents, phosphates, quaternaries, amine salts, and the like. For example, surface active agents are used to assure complete dispersion of active ingredients throughout the corrosion inhibitor composition and thus provide a better contact of the corrosion inhibitor with the surface of the metal compound which is being protected. The corrosion inhibitors of this invention form films on metal surfaces at least as readily as those known film forming corrosion inhibitors.

The corrosion inhibitor of this invention is employed in a functionally effective amount. That is, any quantity of corrosion inhibitor which will provide some degree of inhibition of corrosion is sufficient. Typical amounts of corrosion inhibitor which are employed in an oil and/or gas well treatment can range from about 5 to about 2,000 ppm for continuous treatment or about 1,000 to about 50,000 ppm for squeeze treatment, based on the weight of corrosive well fluids in contact with the metal compositions which are protected. Amounts of corrosion inhibitor in excess of 50,000 ppm can provide additional corrosion inhibition but at increased expense.

The corrosion inhibitors of this invention are highly stable to high temperatures and high pressures. Typically, corrosion inhibitors are employed in applications where temperatures range from about 20° F. to in excess of about 500° F., typically from about 100° F. to about 400° F., depending upon the composition of the polymer product. The corrosion inhibitors of this invention are especially useful at temperatures ranging from 300° F. to about 450° F.

The corrosion inhibitors of the present invention act to protect metal compositions from corrosive effects of fluids (liquids and gases) which are present in, for example, down hole well environments. Such corrosive environments include, brines such as aqueous solutions of inorganic salts such as, for example, alkali and alkaline earth and transition metal salts such as, for example, sodium chloride, calcium chloride, magnesium chloride, calcium bromide, zinc bromide, mixtures thereof and the like. Other corrosive environments include, acids or acid gases such as, for example, hydrogen sulfide, hydrochloric acid, acetic acid, formic and carbon dioxide in the presence of water, combinations thereof and the like. Metal compositions typically include steel, iron, ferrous alloys, and other alloys of which typical sucker rods, valves, pumps, tubing and the like are comprised.

The corrosion inhibitors of this invention inhibit corrosion to metal compositions used in, for example, down hole applications, preferably in excess of 80 percent corrosion protection. The corrosion inhibitors advantageously inhibit corrosion to metal compositions at elevated temperatures exceeding 250° C. in oil and gas well applications. Useful applications include oil and/or gas well drilling, completion, workover, stimulation, transfer, processing and storage applications.

The following examples are presented to further illustrate but not limit the scope of this invention.

PREPARATION OF CORROSION INHIBITORS FOR EVALUATION IN DYNAMIC WHEEL TEST AT 175° F. (79.4° C.) AND 350° F. (177° C.)

EXAMPLE 1

Acrolein was distilled in the presence of 358 ppm and 379 ppm of hydroquinone in the boiling and receiving flasks, respectively. A solution of distilled acrolein was prepared by mixing 282.1 grams (g) acrolein with about 155 g methanol.

Into a 2-liter reactor equipped with mechanical stirrer, immersion thermometer, condensor, addition funnel and nitrogen purge system was placed a solution of 300 g ethylenediamine and about 510 g methanol. The reactor contents were stirred under nitrogen atmosphere while being held at a temperature of about 4° C.

The acrolein solution was added to the reactor over a period of 160 minutes (9600 s) at such a rate that the rise in temperature did not exceed 23° C. The mixture was subjected to rotary evaporation at 100° C. An amount of isopropanol was added to the mixture and said mixture was again subjected to rotary evaporation at 100° C. The product was a yellowish viscous liquid.

EXAMPLE 2

A reaction product of acrolein and ethylenediamine (ethylenediamine/acrolein oligomers) was prepared and isolated as described in Example 1. About 141.6 g of this product was mixed with about 47.5 g methanol to form a solution. The solution was charged into a reactor of the type described in Example 1.

A solution containing 18.5 g of a $C_{12}$–$C_{14}$ mixture was stirred and refluxed at about 68.5° C. After addition was complete, the mixture was stirred overnight at room temperature. The mixture was subjected to rotary evaporation at 100° C. The product was a reddish-brown viscous liquid.

EXAMPLE 3

136.1 g of ethylenediamine/acrolein oligomers of Example 1 was disslved in 785 g isopropanol.

A solution containing 249.3 g of Westvaco Diacid 1550 (a liquid monocyclic $C_{21}$ dicarboxylic acid represented by the following formula:

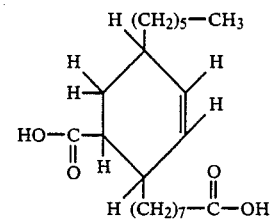

which is commercially available from Westvaco Corporation) and 136.1 g isopropanol was charged into a reactor of the type described in Example 1. To this mixture was added the previously described product mixture. The resulting mixture was refluxed at 86° C. for 30 minutes (1800 s), producing a product, which was believed to be a salt, in isopropanol.

EXAMPLE 4

The mixture from Example 3 was refluxed at 90° C. Water and isopropanol were removed by using a Barrett trap. The reactor contents were heated for about 285 minutes (17,100 s) at about 170° C. to 230° C. This reaction product was cooled to room temperature, and a reddish-brown solid resulted. The product (308.7 g) was redissolved in isopropanol (505 grams).

EXAMPLE 5

A solution containing 411 g tall oil fatty acid, 57 g of Westvaco Diacid 1550 described in Example 3 and 87 g isopropanol was charged into a raactor. To this mixture was added 109 g of the ethylenediamine/acrolein oligomers of Example 1 which was dissolved in 386 g isopropanol. The resulting mixture was refluxed at 200° C. Water and isopropanol were removed using a Barrett trap. The reactor contents were heated for about 370 minutes (22,200 s) between 165° C. to 200° C. The reddish-brown product was cooled to 80° C. and 310 g isopropanol was added. This mixture was cooled to room temperature.

EXAMPLE 6

Into a reactor equipped with stirrer, thermometer, condenser and addition funnel with nitrogen inlet tube was placed a solution of 490 g of Ethyleneamine E-100 and 460 g methanol. Ethyleneamine E-100 is a mixture of tetraethylenepentamine, pentaethylenehexamine and hexaethyleneheptamine with an average molecular weight of about 300 which is commercially available from The Dow Chemical Company. The reactor contents were stirred under nitrogen atmosphere while being held at a temperature of about 4° C.

A solution of acrolein was prepared by mixing 168 g of distilled acrolein with about 160 g methanol. The acrolein was added to the reactor over a period of 145 minutes (8700 s) at such a rate that the rise in temperature did not exceed 18° C. The mixture was subjected to rotary evaporation at 100° C. An amount of isopropanol was added to the mixture and said mixture was again subjected to rotary evaporation at 100° C. The product was a reddish-brown viscous liquid.

EXAMPLE 7

112 g of the Ethyleneamine E-100/acrolein oligomers of Example 6 was poured into a reactor of the type described in Example 1. A solution containing 436 g of the diacid described in Example 3 and 390 g isopropanol was added to the product. The resulting mixture was refluxed at 180° C. Water and isopropanol were removed by using a Barrett trap. The reactor contents were heated for about 120 minutes (7200 s) at about 170° C. to 180° C. The reaction product was cooled to 80° C. and 315 g isopropanol added. On cooling to room temperature a reddish brown liquid resulted.

EXAMPLE 8

Ethylenediamine (120.2 grams, 2 moles) and methanol (157.22 grams) were weighed into a 1-liter resin kettle equipped with an immersion thermometer, condenser, mechanical stirrer, addition funnel and nitrogen purge system. The reactor contents were cooled to less than 10° C. A methanolic solution of acrolein was prepared by mixing 56.06 grams distilled acrolein (1 mole) with 56.06 grams methanol. The methanolic solution of acrolein was added dropwise to the methanolic solution of ethylenediamine at such a rate that the rise in temperature did not exceed 10° C. The reactor contents were subjected to rotary evaporation under full vacuum at 93° C.

The ethylenediamine/acrolein oligomers (9.63 grams), Westvaco Diacid 1550 (34.47 grams, 0.1 mole) and isopropanol (204 grams) were weighed into a 1-liter resin kettle equipped with an immersion thermometer, mechanical stirrer, nitrogen purge system and condenser. The reactor contents were refluxed at 82° C. for one hour (3600 s). Then isopropanol and water were removed by using a Barrett trap as the reaction temperature was increased from 84° C. to 210° C. The reactor contents were heated an additional 210 minutes (12,600 s) at 210° C., cooled to room temperature and dissolved in isopropanol (78.79 grams) by refluxing at 84° C. for one hour (3600 s).

EXAMPLE 9

Ethylenediamine (120.2 grams, 2 moles) and isopropanol (77.9 grams) were weighed into a 1-liter resin kettle of the type described in Example 8. The reactor contents were stirred while cooled to 10° C. An isopropanol solution of acrolein was prepared by mixing 88.1 grams distilled acrolein (1.57 moles) with 38.8 grams isopropanol. The isopropanol solution of acrolein was added dropwise to the isopropanol solution of ethylenediamine over a period of 73 minutes (4380 s) at such a rate that the rise in temperature did not exceed 30° C. Isopropanol (78.4 grams) was added to the reactor contents and the reactor contents stirred for 15 hours (54,000 s) at room temperature. The reactor contents were rotary evaporated under full vacuum at boiling water temperature.

The resultant ethylenediamine/acrolein oligomers (66.66 grams), Westvaco Diacid 1550 (146.59 grams, 0.42 mole) and isopropanol (635.69 grams) were weighed into a 2-liter resin kettle equipped with an immersion thermometer, mechanical stirrer, condenser and nitrogen purge system. The reactor contents were refluxed between 80°-82° C. for one hour (3600 s). Isopropanol and water were removed with a Barrett trap as the reaction temperature was increased from 82° C. to 210° C. The reactor contents were heated an additional 210 minutes (12,600 s) at 210° C., cooled to room temperature and dissolved in isopropanol (304.55 grams) by refluxing at 82° C. for 60 minutes (3600 s).

EXAMPLE 10

N-(2-Aminoethyl)piperazine (253.3 grams, 1.96 moles) and methanol (8118 grams) were weighed into a 1-liter resin kettle of the type described in Example 8. The reactor contents were stirred while cooled to 10° C. A methanolic solution of acrolein was prepared by mixing 44.85 grams distilled acrolein (0.8 mole) with 24 grams methanol. The methanolic solution of acrolein was added dropwise to the methanolic solution of N-(2-aminoethyl)piperazine over a period of 175 minutes (10,500 s) at such a rate that the rise in temperature did not exceed 25° C. The reactor contents were rotary evaporated under full vacuum at boiling water temperature. Isopropanol was added to the rotary evaporation bottoms and this mixture was again subjected to rotary evaporation under full vacuum at boiling water temperature.

The resultant N-(2-aminoethyl)piperazine/acrolein oligomers (129.88 grams), Westvaco Diacid 1550 (241.08 grams, 0.68 mole) and isopropanol (798.54 grams) were weighed into a 2-liter resin kettle of the type described in Example 9. The reactor contents were refluxed at 82° C. for 60 minutes (3600 s). Then isopropanol and water were removed with a Barrett trap as the reaction temperature was increased from 82° C. to 210° C. The reactor contents were heated an additional 210 minutes (12,600 s) at 210° C., cooled to room temperature and dissolved in isopropanol (565.12 grams) by refluxing between 80° C. to 82° C. for one hour (3600 s).

EXAMPLE 11

Triethylenetetramine (318 grams, 2 moles) and methanol (158 grams) were weighed into a 1-liter resin kettle of the type described in Example 8. The reactor contents were stirred while cooled to 10° C. A methanolic solution of acrolein was prepared by mixing 102.02 grams distilled acrolein (1.82 moles) with 102.2 grams methanol. The methanolic solution of acrolein was added dropwise to the methanolic solution of triethylenetetramine at such a rate that the rise in temperature did not exceed 13° C. Methanol and water were removed from the reactor contents by rotary evaporation under full vacuum at boiling water temperature.

The resultant triethylenetetramine/acrolein oligomers (99.81 grams), Westvaco Diacid 1550 (223.15 grams, 0.63 mole) and isopropanol (798.02 grams) were weighed into a 2-liter resin kettle of the type described in Example 9. The reactor contents were refluxed at 84° C. for 60 minutes (3600 s). Isopropanol and water were removed with a Barrett trap as the reaction temperature was increased from 84° C. to 220° C. The reactor contents were heated an additional 210 minutes (12,600 s) at 220° C., cooled to room temperature and dissolved in isopropanol (457.28 grams).

EXAMPLE 12

2-(2-Aminoethylamino)ethanol (418.54 grams, 4.02 moles) and methanol (464.47 grams) were weighed into a 2-liter resin kettle equipped with an immersion thermometer, mechanical stirrer, addition funnel, condenser and nitrogen purge system. The reactor contents were stirred while cooled to 7° C. A methanolic solution of acrolein was prepared by mixing 114.5 grams distilled acrolein (2.04 moles) with 160.9 grams methanol. The methanolic solution of acrolein was added dropwise to the methanolic solution of 2-(2-aminoethylamino)ethanol over a period of 112 minutes (6720 s) at such a rate that the rise in temperature did not exceed 18° C. The resulting red orange liquid was subjected to rotary evaporation under full vacuum at boiling water temperature. Isopropanol was added to the rotary evaporation bottoms, and this mixture was again subjected to rotary evaporation under full vacuum at boiling water temperature.

The 2-(2-aminoethylamino)ethanol/acrolein oligomers (87.86 grams), Westvaco Diacid 1550 (142.31 grams, 0.4 mole) and isopropanol (387.57 grams) were weighed into a 1-liter resin kettle equipped with an immersion thermometer, mechanical stirrer, condenser and nitrogen purge system. The reactor contents were refluxed at 84° C. for one hour (3600 s). Then isopropanol and water were removed by using a Barrett trap as the reaction temperature was increased from 84° C. to 210° C. The reactor contents were heated an additional 120 minutes (7200 s) at 210° C., cooled to room temperature and dissolved in isopropanol (359.42 grams) by refluxing for 60 minutes (3600 s).

EXAMPLE 13

Ethylenediamine (516.78 grams, 8.51 moles) and methanol (451.71 grams) were added to a 3-liter jacketed resin kettle equipped with an immersion thermometer, mechanical stirrer, addition funnel, condenser and nitrogen purge system. The reactor contents were cooled to 4° C. by pumping a chilled aqueous solution of ethylene glycol through the jacket of the resin kettle. A methanolic solution of acrolein was prepared by mixing 480.91 grams distilled acrolein (8.32 moles) with 452.9 grams methanol. The methanolic solution of acrolein was added dropwise to the methanolic solution of ethylenediamine at such a rate that the rise in temperature did not exceed 7° C. The reactor contents were subjected to rotary evaporation under full vacuum at boiling water temperature. Isopropanol (455.52 grams) was added to the rotary evaporation bottoms, and this mixture was again subjected to rotary evaporation under full vacuum at boiling water temperature.

EXAMPLE 14

Ethylenediamine/acrolein oligomers (50 grams) prepared in Example 13, lauric acid (84.7 grams, 0.4235 mole) and isopropanol (202.5 grams) were weighed into a 1-liter resin kettle equipped with an immersion thermometer, mechanical stirrer, condenser and nitrogen purge system. The reactor contents were refluxed at 84° C. for one hour (3600 s). Then isopropanol and water were removed by using a Barrett trap as the reaction temperature was increased from 84° C. to 210° C. The reactor contents were heated an additional 240 minutes (14,400 s) at 210° C., cooled to room temperature and dissolved in isopropanol by refluxing at 84° C. for one hour (3600 s).

EXAMPLE 15

Ethylenediamine/acrolein oligomers (50 grams) prepared in Example 13, tall oil fatty acid (183.1 grams, 0.65 mole) and isopropanol (350 grams) were weighed into a reactor of the type described in Example 13. The reactor contents were refluxed at 84° C. for one hour (3600 s). Then isopropanol and water were removed by using a Barrett trap as the reaction temperature was increased from 84° C. to 210° C. The reactor contents were heated between 84° C. and 210° C. for 230 minutes (13,800 s), cooled to room temperature and dissolved in 1-butanol (379 grams) by refluxing at 84° C. for one hour (3600 s).

EXAMPLE 16

Ethylenediamine (870.49 grams, 14.48 moles) and methanol (758.45 grams) were added to a 4-liter jacketed resin kettle equipped with an immersion thermometer, mechanical stirrer, addition funnel, condenser and nitrogen purge system. The reactor contents were cooled to −2° C. by pumping a chilled aqueous solution of ethylene glycol through the jacket of the resin kettle. A methanolic solution of acrolein was prepared by mixing 811.98 grams of distilled acrolein (14.48 moles) with 765.22 grams methanol. The methanolic solution of acrolein was added dropwise to the methanolic solution of ethylenediamine over a period of 1165 minutes (69,900 s) and at such a rate that the rise in temperature did not exceed 11° C. The reactor contents were rotary evaporated under full vacuum at boiling water temperature. Isopropanol was added to the rotary evaporation bottoms, and this mixture was again rotary evaporated under full vacuum between 95°–98° C.

The ethylenediamine/acrolein oligomers (50 grams), Empol ™ 1003 (147.05 grams, 0.25 mole) and isopropanol (296 grams) were weighed into a reaotor of the type described in Example 14. Empol ™ 1003 is a $C_{36}$ dimer carboxylic acid which is commercially available from Emery Industries, Inc. The reactor contents were refluxed at 84° C. for one hour (3600 s). Then isopropanol and water were removed by using a Barrett trap as the reaction temperature was increased from 84° C. to 220° C. over a period of 77 minutes (4620 s). The reactor contents were cooled to room temperature and dissolved in isopropanol (323.7 grams) by refluxing at 84° C. for one hour (3600 s).

EXAMPLE 17

Ethylenediamine (1004.43 grams, 16.71 moles) and methanol (631.87 grams) were weighed into a 4-liter reactor of the type described in Example 16. A methanolic solution of acrolein was prepared by mixing 965.42 grams distilled acrolein (17.24 moles) with 628.14 grams methanol. The methanolic solution of acrolein was added dropwise to the methanolic solution of ethylenediamine cooled at 0.8° C. over a period of 1260 minutes (75,600 s) and at such a rate that the rise in temperature did not exceed 8° C. The reactor contents were rotary evaporated under full vacuum at boiling water temperature. Isopropanol was added to the rotary evaporation bottoms, and this mixture was again rotary evaporated under full vacuum at boiling water temperature.

The ethylenediamine/acrolein oligomers (50 grams), Naphthenic Acid (195.5 grams, 0.77 moles) and isopropanol (368 grams) were weighed into a reactor of the type described in Example 14. Naphthenic Acid is a mixture of cyclohexane carboxylic acids which is commercially available from the Exxon Chemical Co. The reactor contents were refluxed at 84° C. for one hour (3600 s). Then isopropanol and water were removed by using a Barrett trap as the reaction temperature was increased from 84° C. to 220° C. The reactor contents were heated between 200° to 220° C. for 185 minutes (11,100 s), cooled to room temperature and dissolved in isopropanol (402 grams) by refluxing at 84° C. for one hour (3600 s).

EXAMPLE 18

Ammonium chloride (53.48 grams, 1 mole) and methanol (79.75 grams) were added to a 4-neck 250 milliliter round bottom flask equipped with an immersion thermometer, dewar condenser containing a mixture of dry ice and methanol, mechanical stirrer, addition funnel and nitrogen purge system. A methanolic solution of acrolein was prepared by mixing 56.16 grams distilled acrolein (1 mole) with 47.87 grams methanol. The methanolic solution of acrolein was added dropwise to the methanolic solution of ammonium chloride at 58° C. over a period of 105 minutes (6300 s). The reaction temperature was maintained at 58° C. for an additional 905 minutes (54,300 s). A methanolic solution of ethylenediamine was prepared by mixing 30.18 grams ethylenediamine (0.5 mole) with 20.46 grams methanol. The methanolic solution of ethylenediamine was added to the reactor contents at a temperature between 58° C. to 65° C. over a period of 67 minutes (4020 s). The reaction temperature was maintained between 65° C. and 70° C. for 73 minutes (4380 s). A Barrett trap was installed, and methanol and water were removed as the reaction temperature was increased from 70° C. to 115° C. over a period of 120 minutes (7200 s). The reactor contents were a reddish brown solid after they were cooled to room temperature. The reddish brown solid was dissolved in methanol for the corrosion inhibition tests.

EXAMPLE 19

The reddish brown solid from Example 18 (50.54 grams), Westvaco Diacid 1550 (109.78 grams, 0.31 mole) and isopropanol (235.98 grams) were weighed into a reactor of the type described in Example 14. The reactor contents were refluxed at 82° C. for 80 minutes (4800 s) A Barrett trap was installed and reaction temperature increased from 70° C. to 210° C. as water and isopropanol were removed. The reaction temperature was maintained at 210° C. for 225 minutes (13,500 s). The reactor contents were a brown taffy-like solid after they were cooled to room temperature. The brown solid was dissolved in water for the corrosion inhibition tests.

EXAMPLE 20

Ethylenediamine (114.35 grams, 1.9 moles), KEMAMINE TM P-650 (20.28 grams, 0.099 mole) and methanol (156.84 g) were weighed into a 1-liter resin kettle of the type described in Example 8. KEMAMINE TM P-650 is a mixture of $C_{10}$-$C_{18}$ primary amines commercially available from Witco Chemical Corp. which consists primarily of 1-decanamine, 1-dodecanamine, 1-tetradecanamine, 1-hexadecanamine, 1-octadecanamine and octadecen-1-amine. A methanol solution of acrolein was prepared by mixing 112.07 grams (2 moles) distilled acrolein with 157.58 grams methanol. The methanolic solution of acrolein was added dropwise to the methanolic solution of amines over a period of 91 minutes (5460 s) and at a rate that the rise in temperature did not exceed 16° C. The reactor contents were rotary evaporated under full vacuum at boiling water temperature. Isopropanol was added to the rotary evaporation bottoms, and this mixture was again rotary evaporated under full vacuum at boiling water temperature.

EXAMPLE 21

The ethylenediamine/KEMAMINE TM P-650/acrolein oligomers (102.45 grams), Westvaco Diacid 1550 (200.6 grams, 0.57 mole) and isopropanol (335.6 grams) were weighed into a reactor of the type described in Example 14. The reactor contents were refluxed between 84° C.–85° C. for 66 minutes (3960 s). Then isopropanol and water were removed by using a Barrett trap as the reaction temperature was increased from 84° C. to 211° C. over a period of 108 minutes (6480 s). The reactor contents were heated between 208° C. to 213° C. for 203 minutes (12,180 s), cooled to 150° C. and dissolved in isopropanol (228.53 grams) by refluxing at 84° C. for one hour (3600 s).

EXAMPLE 22

Ethylenediamine (714.04 grams, 11.88 moles) and methanol (547.06 grams, 17.07 moles) were added to a 3-liter jacketed resin kettle equipped with an immersion thermometer, mechanical stirrer, nitrogen purge system and condenser. The reactor contents were cooled between 5° C. and 10° C. by pumping a chilled aqueous solution of ethylene glycol through the jacket. A methanolic solution of acrolein was prepared by mixing 667.53 grams distilled acrolein (11.91 moles) with 623.97 grams methanol (19.47 moles). The methanolic solution of acrolein was pumped from a reservoir at a rate of 2 milliliters of the methanolic solution of acrolein per minute through a 0.5–1 mm i.d. stainless steel transfer line oriented for subsurface addition into the methanolic solution of ethylenediamine with a Milton Roy pump. The acrolein was added to the reactor over a period of 794 minutes (47,640 s) at a temperature between −2° C. and 6° C. The reactor contents were subjected to rotary evaporation under full vacuum at boiling water temperature. Isopropanol (300 milliliters) was added to the rotary evaporation bottoms and this mixture was again subjected to rotary evaporation under full vacuum at boiling water temperature. The resulting ethylenediamine/acrolein oligomers (506.11 grams) were dissolved in isopropanol (740.12 grams).

EXAMPLE 23

The isopropanol solution (73.05 grams) of 68.38 weight percent ethylenediamine/acrolein oligomers prepared in Example 22, oleic acid (128.79 grams, 0.46 mole) and isopropanol (156.05 grams) were weighed into a reactor of the type described in Example 14. The reactor contents were refluxed at 84° C. for 1 hour (3600 s) and then cooled to room temperature giving an isopropanol solution of 50 weight percent salt of oleic acid with ethylenediamine/acrolein oligomers.

EXAMPLE 24

A Barrett trap was attached to the reactor of Example 23 and isopropanol and water removed as the reaction temperature was increased from 25° C. to 210° C. over a period of 140 minutes (8400 s). The reactor contents were heated at 210° C. for 295 minutes (17,700 s) and then cooled to room temperature giving a black viscous liquid. The black viscous liquid was dissolved in isopropanol for the corrosion inhibition tests.

EXAMPLE 25

The isopropanol solution of 68 weight percent ethylenediamine/acrolein oligomers (35.43 grams) prepared in Example 22 and methanol (59.95 grams) were weighed into a 500 milliliter resin kettle equipped with an immersion thermometer, mechanical stirrer, nitrogen purge system and condenser. 1-Bromooctadecane (73.58 grams, 0.22 mole) was added to the reactor contents. The reactor contents were refluxed for 61 minutes (3660 s) between 69° C.–75° C. A Barrett trap was installed and methanol and isopropanol were removed as the reaction temperature was increased from 69° C. to 210° C. over a period of 211 minutes (12,660 s). The reactor contents were heated an additional 345 minutes (20,700 s) between 210° C.–250° C. and then cooled to room temperature.

EXAMPLE 26

The product from the reaction of ethylenediamine/acrolein oligomers with 1-bromooctadecane described in Example 25 (24.27 grams), water (75 milliliters) and an aqueous solution of 58.61% sodium hydroxide (7.15 grams) were stirred at 90° C. for 10 minutes (600 s). After the mixture was cooled to room temperature, the mixture was extracted with diethylether and chloroform. The diethylether and chloroform extracts were subjected to rotary evaporation under full vacuum giving a black viscous liquid. The black liquid was mixed with isopropanol and the isopropanol removed by rotary evaporation under full vacuum.

EXAMPLE 27

Ethyleneamine E-100 (1127.27 grams) and methanol (617.52 grams) were added to the 4-liter resin kettle of the type described in Example 16. A methanolic solution of acrolein was prepared by mixing 441.72 grams distilled acrolein (7.88 moles) with 386.02 grams methanol. The acrolein was pumped into the reactor over a period of 507 minutes (30,435 s) at a temperature between 3° C. and 6° C. The reactor contents were subjected to rotary evaporation under full vacuum at boiling water temperature. Isopropanol (300 milliliters) was added to the rotary evaporation bottoms and this mixture was again subjected to rotary evaporation under full vacuum at boiling water temperature.

The Ethyleneamine E-100/acrolein oligomers (50.31 grams), methanol (102.83 grams) and 1-bromooctadecane (185.23 grams, 0.56 mole) were weighed into a 500 milliliter reactor of the type described in Example 25. The reactor contents were refluxed for 78 minutes (4680 s) at 70° C. A Barrett trap was installed and methanol was removed as the reaction temperature was increased from 70° C. to 200° C. over a period of 90 minutes (5400 s). The reactor contents were heated an additional 5 minutes (300 s) between 200° C. to 210° C. and then cooled to room temperature. The resulting brown solid was dissolved in xylene for the corrosion inhibition tests.

EXAMPLE 28

The product from the reaction of Ethyleneamine E-100/acrolein oligomers with 1-bromooctadecane described in Example 27 (50.18 grams) and an aqueous solution of 34% sodium hydroxide (152.37 grams) were stirred while warming on a hot plate until complete dissolution. After the mixture was cooled to room temperature, the mixture was extracted with diethylether (200 milliliters). The diethylether extract was subjected to rotary evaporation under full vacuum. The resulting rotary evaporation bottoms were extracted with chloroform (300 milliliters). The chloroform extract was subjected to rotary evaporation under full vacuum giving a dark brown solid. The dark brown solid was dissolved in xylene for the corrosion inhibition tests.

COMPARATIVE EXPERIMENT A

Diethylenetriamine (51.23 grams, 0.5 mole) and benzene (27.64 grams, 0.35 mole) were weighed into a 4-neck 250 milliliter round bottom flask equipped with an immersion thermometer, condenser, mechanical stirrer, nitrogen purge system and addition funnel. Benzaldehyde (48.5 grams, 0.46 mole) was added slowly to the reactor contents between 85° C. to 89° C. during a 75 minute (4500 s) period. Benzene and water were removed with a Barrett trap, as the reaction temperature was increased to 190° C. over a period of 45 minutes (2700 s). The reactor contents were heated for an additional 2 hours (7200 s) at 190° C. The reactor contents were cooled to room temperature and benzene (31.88 grams) added to them. Heptaldehyde (43.32 grams, 0.38 mole) was added slowly to the reactor contents at 80° C. over a 65 minute (3900 s) period. Benzene and water were removed with a Barrett trap, as the reaction temperature was increased to 190° C. over a period of 43 minutes (2580 s). The reactor contents were heated for an additional 2 hours (7200 s) at 190° C.

COMPARATIVE EXPERIMENT B

The final product (25.06 grams) from Comparative Experiment A and oleic acid (17.26 grams, 0.06 mole) were weighed into a reactor of the type described in Comparative Experiment A. The reactants were heated between 80° C.–120° C. for 55 minutes (3300 s) and then cooled to room temperature.

COMPARATIVE EXPERIMENT C

Ethylenediamine (21.9 grams, 0.36 mole) and benzene (28.37 grams, 0.36 mole) were weighed into a reactor of the type described in Comparative Experiment A. Benzaldehyde (38.72 grams, 0.36 mole) was added slowly to the reactor contents at 85° C. over a 32 minute (1920 s) period. Benzene and water were removed with a Barrett trap as the reaction temperature was increased to 190° C. over a 73 minute (4380 s) period. The reactor contents were heated for an additional 2 hours (7200 s) at 190° C. The reactor contents were cooled to room temperature and benzene (28.22 grams) added to them. Heptaldehyde (21.65 grams, 0.19 mole) was added slowly to the reactor contents at 80° C. over a 39 minute (2340 s) period. Benzene and water were removed with a Barrett trap, as the reaction temperature was increased to 190° C. over a 52 minute (3120 s) period. The reactor contents were heated for an additional 2 hours (7200 s) at 190° C.

COMPARATIVE EXPERIMENT D

Diethylenetriamine (85 grams, 0.83 mole) and benzene (42.12 grams) were weighed into a reactor of the type described in Comparative Experiment A. A 37% aqueous solution of formaldehyde (61.06 grams, 0.75 mole) was added slowly to the reactor contents between 68° C.–70° C. over a 195 minute (11,700 s) period. Benzene and water were removed with a Barrett trap as the reaction temperature was increased to 190° C. over a period of 126 minutes (7560 s). The reactor contents were cooled to 100° C., and heptaldehyde (85.64 grams, 0.75 mole) was added slowly to the reactor contents between 95° C.–100° C. over a 50 minute (3000 s) period. Benzene and water were removed with a Barrett trap, as the reaction temperature was incrementally increased to 190° C. over a 25 minute (1500 s) period. The reactor contents were heated an additional 3 hours 20 minutes (12,000 s) at 190° C.

COMPARATIVE EXPERIMENT E

The final product (25 grams) from Comparative Experiment D and oleic acid (23.46 grams, 0.08 mole) were weighed into a reactor of the type described in Comparative Experiment A. The reactants were heated between 80° C.–100° C. for 65 minutes (3900 s) and then cooled to room temperature.

COMPARATIVE EXPERIMENT F

A benzyl chloride quaternized aminoamide polymer was prepared according to the procedure of Example 6 in U.S. Pat. No. 4,315,087 by Redmore and Outlaw.

PREPARATION OF CORROSION INHIBITOR FOR EVALUATION IN ZINC/CALCIUM BROMIDE CLEAR BRINE FLUID TEST, 250° F. (121.11° C.)

EXAMPLE 29

Ethylenediamine (872.07 grams, 14.51 moles) and methanol (759.30 grams) were weighed into a reactor of the type described in Example 16. The reactor contents were stirred while cooled to −10° C. A methanolic solution of acrolein was prepared by mixing 856.11 grams distilled acrolein (15.27 moles) with 764.60 grams methanol. The methanolic solution of acrolein was pumped from a reservoir at a rate of 2.25 milliliters of the methanolic solution of acrolein per minute through a 0.5–1 mm i.d. stainless steel transfer line oriented for subsurface addition into the methanolic solution of ethylenediamine with a Milton Roy pump. The reaction product was subjected to rotary evaporation under full vacuum at boiling water temperature. Isopropanol (305.05 grams) was added to the rotary evaporation bottoms and this mixture was again subjected to rotary evaporation under full vacuum again at boiling water temperature.

The ethylenediamine/acrolein oligomers (50.56 grams), Westvaco Diacid 1550 (86.42 grams, 0.25 mole) and isopropanol (175.88 grams) were weighed into a 500 milliliter reactor of the type described in Example 25. The reactor contents were refluxed for 60 minutes (3600 s) at 82° C. and then cooled to room temperature giving an isopropanol solution of 44% salt of Westvaco Diacid 1550 with ethylenediamine/acrolein oligomers. Infrared spectroscopy supported the presence of the salt with a strong band at 1555 cm$^{-1}$ and a weaker band at 1397 cm$^{-1}$.

PREPARATION OF CORROSION INHIBITORS FOR EVALUATION IN HYDROCHLORIC ACID STIMULATION TEST, 175° F. (79.4° C.)

EXAMPLE 30

Ethylenediamine (100 grams, 1.66 moles) and methanol (500 milliliters) were added to a 2-liter resin kettle of the type described in Example 1. The reactor contents were stirred while cooled to less than 5° C. with an ice-water bath. Distilled acrolein (88 grams, 1.58 moles) was added dropwise to the methanolic solution of ethylenediamine. The reactor contents were rotary evaporated under full vacuum at boiling water temperature. Toluene was added to the rotary evaporator bottoms, and this mixture was rotary evaporated under full vacuum at boiling water temperature giving a viscous, wax-like solid. Infrared spectroscopy supports the presence of NH, NH$_2$, imine (C=N) and ether groups. CHN analysis indicated the ethylenediamine/acrolein oligomers contained 62.1 wt. % carbon, 22.6 wt. % nitrogen, 10.6 wt. % hydrogen and 4.7 wt. % oxygen.

EXAMPLE 31

Ethylenediamine (99.5 grams, 1.66 moles) and methanol (386.6 grams) were weighed into a reactor of the type described in Example 1. The reactor contents were stirred while cooled to 2° C. with an ice-water bath. A methanolic solution of acrolein was prepared by mixing 120.6 grams distilled acrolein (2.15 moles) with 165 grams methanol. The acrolein was distilled in the presence of 342 and 368 ppm hydroquinone in the boiling and receiver flasks, respectively. The methanolic solution of acrolein was added dropwise to the methanolic solution of ethylenediamine over a period of 108 minutes (6480 s) at such a rate that the rise in temperature did not exceed 15° C. The reactor contents were rotary evaporated under full vacuum at boiling water temperature. Isopropanol was added to the rotary evaporator bottoms, and this mixture was rotary evaporated under full vacuum at boiling water temperature. The resultant ethylenediamine/acrolein oligomers was a mixture of a white crystalline solid and a yellow viscous liquid.

EXAMPLE 32

Ethylenediamine (100.1 grams, 1.67 moles) and methanol (387.9 grams) were weighed into a reactor of the type described in Example 1. The reactor contents were stirred in a nitrogen atmosphere while cooled to 2° C. with an ice-water bath. A methanolic solution of distilled acrolein was prepared by mixing 129.8 grams distilled acrolein (2.32 moles) with 153.9 grams methanol. The acrolein was distilled in the presence of 402 and 374 ppm of hydroquinone in the boiling and receiver flasks, respectively. The methanolic solution of acrolein was added dropwise to the methanolic solution of ethylenediamine over a period of 75 minutes (4500 s) at such a rate that the rise in temperature did not exceed 20° C. Twenty minutes after the acrolein addition was complete, the reactor contents reached maximum viscosity at room temperature giving a rubberlike solid. This solid was grounded with a mortar and pestle. Isopropanol was added to the grounded solid and rotary evaporated under full vacuum at boiling water temperature.

EXAMPLE 33

Diethylenetriamine (206 grams, 2 moles) and methanol (390.5 grams) were weighed into a reactor of the type described in Example 1. The reactor contents were stirred in a nitrogen atmosphere while cooled to 0.5° C. with an ice-water bath. A methanolic solution of acrolein was prepared by mixing 181.4 grams distilled acrolein (3.24 moles) with 155.3 grams methanol. The methanolic solution of acrolein was added dropwise to the methanolic solution of diethylenetriamine over a period of 110 minutes (6600 s) at such a rate that the rise in temperature did not exceed 19° C. The reactor contents were rotary evaporated under full vacuum at boiling water temperature. Isopropanol was added to the rotary evaporator bottoms, and this mixture was rotary evaporated under full vacuum at boiling water temperature giving a mixture of a white crystalline solid and clear viscous liquid. Only the clear viscous liquid was tested as a corrosion inhibitor.

EXAMPLE 34

Ethyleneamine E-100 (245 grams, 1 mole) and methanol (386 grams) were weighed into a reactor of the type described in Example 1. The reactor contents were stirred in a nitrogen atmosphere while cooled to −1° C. with an ice-water bath. A methanolic solution of acrolein was prepared by mixing 74.7 grams distilled acrolein (1.33 moles) with 157.7 grams methanol. The methanolic solution of acrolein was added dropwise to the methanolic solution of Ethyleneamine E-100 over a period of 67 minutes (4020 s) at such a rate that the rise in temperature did not exceed 8° C. The reactor contents were rotary evaporated under full vacuum at boiling water temperature giving a viscous liquid.

EXAMPLE 35

The product from the reaction of Epoxide 8 with ethylenediamine/acrolein oligomers (43.6 grams) described in Example 2 was mixed with isopropanol (65.9 grams) in a reactor of the type described in Example 1. The reactor contents were heated to 85° C. while stirring in a nitrogen atmosphere.

EXAMPLE 36

Propargyl alcohol (0.39 gram) was mixed with the cooled isopropanol solution (3.85 grams) of the product from the reaction of Epoxide 8 with ethylenediamine/acrolein oligomers described in Example 35.

EXAMPLE 37

An aqueous solution of 37% formaldehyde (14.6 grams, 0.49 mole) was added to the isopropanol solution of the product (37 grams) from the reaction of Epoxide 8 with ethylenediamine/acrolein oligomers described in Example 35 over a period of 24 minutes (1440 s) while the reaction temperature was maintained between 83° C. and 85° C. Isopropanol (100 milliliters) was added to the reactor contents after they were cooled to 56° C. The reactor contents were heated until they refluxed (85° C.) and then cooled to room temperature. Isopropanol and water were removed by rotary evaporation under full vacuum at boiling water temperature.

EXAMPLE 38

The product from the reaction of formaldehyde and Epoxide 8 with ethylenediamine/acrolein oligomers (75.6 grams) described in Example 37 and isopropanol (88 grams) were weighed into a reactor of the type described in Example 1. The reactor contents were heated to the reflux temperature and then cooled to room temperature. Propargyl alcohol (3.6 grams) was added to the reactor contents (33.7 grams).

EXAMPLE 39

The product from the reaction of formaldehyde and Epoxide 8 with ethylenediamine/acrolein oligomers in isopropanol after mixing with propargyl alcohol described in Example 38 (24.5 grams) was mixed further with an aqueous solution of 37% formaldehyde (11.1 grams, 0.37 mole).

EXAMPLE 40

Propargyl alcohol (11.6 grams) was mixed at room temperature with the isopropanol solution (89 grams) of 37.9 weight percent product from the reaction of Westvaco Diacid 1550 with ethylenediamine/acrolein oligomers described in Example 4.

EXAMPLE 41

The onset of thermal decomposition of various corrosion inhibitor chemistries in a nitrogen atmosphere was determined by thermal analysis techniques including Differential Scanning Calorimetry (DSC) and Thermal Gravimetric Analysis (TGA) with a Dupont 1090 Thermal Analyzer. An exotherm associated with weight loss was determined as the onset of degradation. In the Differential Scanning Calorimetry analysis, the samples were placed in an aluminum pan and programmed from 25° C. to 500° C. at 10° C./minute (0.167° C./s) with a nitrogen purge. In the Thermal Gravimetric Analysis, the samples were placed in a platinum pan and programmed from 25° C. to 500° C. at 10° C./minute (0.167° C./s) with a nitrogen purge. Samples included the reaction product of ethylenediamine, acrolein and Westvaco Diacid 1550 described in Example 4, two commercially available corrosion inhibitors and corrosion inhibitors prepared in U.S. Pat. Nos. 2,643,977 and 4,315,087. Results are presented in Table I.

TABLE I

| Sample | Proposed Decomposition Temperature (°C.) |
| --- | --- |
| Ex. 4 | 420 |
| Corban A-162[1]* | 300 |
| Textamine T5D[2]* | 350 |
| Comp. Expt. D* | 200 |
| Comp. Expt. E* | 275 |
| Comp. Expt. F* | 250 |

*Not an example of the present invention.
[1]Corban A-162 is a commercial corrosion inhibitor available from Dowell-Schlumberger.
[2]Textamine T5D is a commercial corrosion inhibitor available from Henkel as Textamine T5D.

The data of Table I indicates that the corrosion inhibitor os this invention has a superior thermal stability to those corrosion inhibitors which are commercially available and the corrosion inhibitors in U.S. Pat. Nos. 2,643,977 and 4,315,087.

EXAMPLE 42

Corrosion inhibition of various samples was determined under conditions which simulate conditions that exist in oil and gas wells as follows. A brine solution containing 89.89 percent deionized water, 9.62 percent sodium chloride, 0.305 percent calcium chloride and a 0.186 percent hydrated magnesium chloride complex was prepared. This brine solution was saturated under carbon dioxide purge until a pH of 3.8 was achieved. The solution was treated with sodium sulfite to remove oxygen The desired corrosion inhibitor was added to the solution. About 720 milliliters (ml) of this brine solution and 80 ml of kerosene treated with sodium sulfite were charged into a 32-ounce bottle. To this charge was added enough hydrated sodium sulfide to generate a suitable amount of hydrogen sulfide (i.e., about 300 ppm hydrogen sulfide based on total fluids).

Metal coupons (12"×¼"×1/16", 304.8 mm×6.35 mm×1.59 mm) of 1020 carbon steel were degreased with an inhibited methylchloroform, acidized with 16 percent hydrochloric acid, washed and dried. Each coupon weighed about 19 g. A metal coupon was placed in the bottle containing the brine, kerosene and ingredients as previously described. The bottle was capped and acetic acid was injected into the bottle through a septum. The bottle was placed on a vertically rotating wheel held at 175° C. (79.4° C.) and the sample was rotated at 26 rpm for 24 hours (86,400 s). The coupons were removed from the bottle, cleaned, washed, dried and reweighed.

The percent protection afforded them by the inhibitor was calculated as the percent protection by the following formula:

$$\text{Percent Protection} = \frac{(\text{Corrosion rate without inhibitor} - \text{corrosion rate with inhibitor}) \times 100}{\text{corrosion rate without inhibitor}}$$

Corrosion rates were determined in milliinches per year (mpy) by the following formula:

$$mpy = \frac{534 \, (\text{Mg Weight Loss of Coupon})}{d \times a \times t}$$

d = density of 1020 carbon steel = 7.86 g/ml
a = surface area (in$^2$.) of metal coupons
t = test time in hours The amount of corrosion of untreated coupons were compared to coupons which were tested in the presence of 100 ppm of each corrosion inhibitor sample. Results are presented in Table II.

TABLE II

| | | 80° C. Wheel Test | | | |
|---|---|---|---|---|---|
| Test | Inhibitor | Concentration (ppm) | Weight Loss (grams) | Corrosion Rate (MPY*) | % Protection |
| A | None* | 0 | 0.0336 | 14.1 | 0 |
|   | Ex. 2 | 100 | 0.0051 | 2.1 | 85 |
| B | None* | 0 | 0.0810 | 34.1 | 0 |
|   | Ex. 3 | 100 | 0.0126 | 5.2 | 84 |
|   | Ex. 4 | 100 | 0.0133 | 5.5 | 84 |
|   | Ex. 6 | 100 | 0.0178 | 7.4 | 78 |
| C | None* | 0 | 0.1766 | 64.1 | 0 |
| D | None* | 0 | 0.1004 | 36.2 | 0 |
|   | Ex. 7 | 100 | 0.0102 | 3.7 | 90 |
| E | None* | 0 | 0.1674 | 61.1 | 0 |
|   | Ex. 8 | 100 | 0.0076 | 2.7 | 96 |
|   | Ex. 9 | 100 | 0.0144 | 5.1 | 91 |
| F | None* | 0 | 0.2014 | 74.1 | 0 |
|   | Ex. 10 | 100 | 0.0363 | 13.1 | 82 |
|   | Ex. 11 | 100 | 0.0112 | 4.0 | 94 |
| G | None* | 0 | 0.2326 | 93.7 | 0 |
|   | Ex. 14 | 100 | 0.0162 | 6.8 | 93 |
| H | None* | 0 | 0.1555 | 63.6 | 0 |
|   | Ex. 15 | 100 | 0.0064 | 2.6 | 96 |

TABLE II-continued

| | | 80° C. Wheel Test | | | |
|---|---|---|---|---|---|
| Test | Inhibitor | Concentration (ppm) | Weight Loss (grams) | Corrosion Rate (MPY*) | % Protection |
| I | None* | 0 | 0.1774 | 72.0 | 0 |
|   | Ex. 16 | 100 | 0.0088 | 3.6 | 95 |
| J | None* | 0 | 0.2063 | 79.6 | 0 |
|   | Ex. 17 | 100 | 0.0145 | 5.6 | 93 |
| K | None* | 0 | 0.1916 | 72.9 | 0 |
|   | Ex. 18 | 100 | 0.0981 | 36.7 | 49 |
| L | None* | 0 | 0.1733 | 65.7 | 0 |
|   | Ex. 19 | 100 | 0.0087 | 3.3 | 95 |
|   | Ex. 23 | 100 | 0.0282 | 10.7 | 84 |
|   | Ex. 24 | 100 | 0.0033 | 1.3 | 98 |
| M | None* | 0 | 0.1496 | 58.0 | 0 |
|   | Ex. 20 | 100 | 0.0408 | 3.6 | 94 |
| N | None* | 0 | 0.2542 | 97.9 | 0 |
|   | Ex. 21 | 100 | 0.0141 | 5.5 | 94 |
| O | None* | 0 | 0.1808 | 68.2 | 0 |
|   | Ex. 25 | 100 | 0.0065 | 2.5 | 96 |
| P | None* | 0 | 0.1701 | 65.8 | 0 |
|   | Ex. 26 | 100 | 0.0048 | 1.8 | 97 |
|   | Ex. 28 | 100 | 0.0082 | 3.2 | 95 |
| Q | None* | 0 | 0.1819 | 70.1 | 0 |
|   | Ex. 27 | 100 | 0.0088 | 3.4 | 95 |
| R | None* | 0 | 0.2077 | 80.6 | 0 |
|   | Comp. Expt. A* | 100 | 0.0028 | 1.1 | 99 |
|   | Comp. Expt. D* | 100 | 0.0056 | 2.1 | 97 |
| S | None* | 0 | 0.1912 | 73.1 | 0 |
|   | Comp. Expt. B* | 100 | 0.0054 | 2.1 | 97 |
|   | Comp. Expt. C* | 100 | 0.0029 | 1.1 | 99 |
| T | None* | 0 | 0.1721 | 65.6 | 0 |
|   | Comp. Expt. D | 100 | 0.0050 | 1.9 | 97 |
| U | None* | 0 | 0.1701 | 65.8 | 0 |
|   | Comp. Expt. E* | 100 | 0.0159 | 6.1 | 91 |
| V | None* | 0 | 0.3328 | 131.0 | 0 |
|   | Corban A-163*[2] | 100 | 0.0658 | 26.0 | 80 |

*Not an example of the present invention.
[1]MPY is mils per year
[2]Corban A-163 is a commercial corrosion inhibitor available from Dowell-Schlumberger The data in Table II indicates that the samples of this invention exhibit good corrosion inhibition under simulated down hole tests. The corrosion inhibition of the samples of this invention is comparable to that exhibited by commercially available corrosion inhibitors and the corrosion inhibitors in U.S. Pat. No. 2,643,977 by Hughes and U.S. Pat. No. 4,315,087 by Redmore and Outlaw.

EXAMPLE 43

The corrosion protection afforded by various corrosion inhibitors is often improved by the presence of hydrogen sulfide. In other words, the corrosion inhibition of an inhibitor in non-hydrogen sulfide environments (sweet) is 10–20 percent less than the corrosion protection achieved in otherwise similiar hydrogen sulfide environments. It is a common practice to alleviate this problem by incorporating sulfur or sulfur containing compounds into a formulated corrosion inhibitor by adding, for example, thiourea, dimethylsulfate, trithiones, and the like. This example demonstrates the performance of the inhibitors of this invention in non-hydrogen sulfide environments via a 175° F. test excluding hydrogen sulfide. Results are presented in Table III. The numbers in parenthesis are the results of the same inhibitor in a similiar test containing hydrogen sulfide.

TABLE III

| Inhibitor Sample | Concentration | Weight Loss (grams) | Corrosion Rate (MPY**) | % Protection |
|---|---|---|---|---|
| None* | 0 | 0.1184 (0.0810) | 43 (34.1) | 0 |
| Ex. 3 | 100 ppm | 0.0196 (0.0126) | 7 (5.2) | 83 (84) |
| Ex. 4 | 100 ppm | 0.0122 (0.0133) | 4 (5.5) | 90 (84) |

*Not an example of the present invention.
**MPY is mils per year.

These results indicate that the inhibitors of this invention perform nearly equally in hydrogen sulfide or non-hydrogen sulfide and carbon dioxide brine environments. Thus, the inhibitors of this invention advantageously provide good corrosion protection in sweet and/or sour down hole oil and gas well environments and require no special formulating for non-hydrogen sulfide environments.

EXAMPLE 44

The following example demonstrates the performance of the inhibitors of this invention in a 350° F. wheel test containing 90 percent brine/8 percent heptane/2 percent kerosene at 2,000 psi pressure (25° C.) with 10 percent hydrogen sulfide, 10 percent carbon dioxide and 80 percent methane in a stainless steel pipe bomb. The sample was rotated at 26 rpm for 24 hours (86,400 s). Metal coupons (6"×¼"×1/16", 152.4 mm×6.35 mm×1.59 mm) of 1020 carbon steel were degreased with chlorothene, scrubbed, washed with acetone and dried before being placed in the pipe bomb. After the test, the coupons were removed from the pipe bomb, scrubbed, washed with acetone and dried. The percent protection provided by the inhibitor was calculated by using the folloing formula:

$$\text{Percent Protection} = 100 - \frac{\text{inhibitor coupon wt. loss}}{\text{blank coupon wt. loss}} \times 100$$

The weight loss was given to the nearest whole percent. The tests wherein no inhibitor was employed were for comparative purposes and were designated as blanks.

TABLE IV

| | | 177° C. Wheel Test | | |
|---|---|---|---|---|
| Test | Inhibitor | Concentration (ppm) | Weight Loss (grams) | % Protection |
| A | None* | 0 | 0.1082 | 0 |
| | Ex. 2 | 100 | 0.0630 | 42 |
| | Ex. 4 | 100 | 0.0197 | 82 |
| B | None* | 0 | 0.1302 | 0 |
| | Ex. 8 | 100 | 0.0137 | 90 |
| | Ex. 9 | 100 | 0.0161 | 88 |
| C | None* | 0 | 0.1432 | 0 |
| | Ex. 10 | 100 | 0.0171 | 84 |
| | Ex. 11 | 100 | 0.0180 | 83 |
| | Ex. 12 | 100 | 0.0191 | 85 |
| D | None* | 0 | 0.1582 | 0 |
| | Ex. 14 | 100 | 0.0300 | 82 |
| | Ex. 15 | 100 | 0.0266 | 84 |
| E | None* | 0 | 0.1302 | 0 |
| | Ex. 16 | 100 | 0.0165 | 88 |
| F | None* | 0 | 0.1192 | 0 |
| | Ex. 17 | 100 | 0.0113 | 91 |
| G | None* | 0 | 0.1437 | 0 |
| | Ex. 20 | 100 | 0.0429 | 71 |
| | Ex. 21 | 100 | 0.0269 | 82 |
| H | None* | 0 | 0.0997 | 0 |
| | Ex. 26 | 100 | 0.0307 | 69 |
| I | None* | 0 | 0.1022 | 0 |
| | Ex. 28 | 100 | 0.0213 | 79 |
| J | None* | 0 | 0.1000 | 0 |
| | Comp. Expt. A* | 100 | 0.096 | 22 |
| | Comp. Expt. B* | 100 | 0.035 | 65 |
| | Comp. Expt. C* | 100 | 0.035 | 64 |
| | Comp. Expt. D* | 100 | 0.037 | 63 |
| | Comp. Expt. E* | 100 | 0.040 | 60 |
| | Comp. Expt. F* | 100 | 0.080 | 20 |
| K | None* | 0 | 0.1082 | 0 |
| | Corban A-163[1] | 100 | 0.0246 | 77 |
| | Textamine T5D[2] | 100 | 0.0485 | 55 |

[1]Corban A-163 is a commercial corrosion inhibitor available from Dowell-Schlumberger.
[2]Textamine T5D is a commercial corrosion inhibitor available from Henkel as Textamine T5D.

Except for the $C_{12}$-$C_{14}$ glycidyl ether derivative of the ethylenediamine/acrolein oligomers from Example 2, the inhibitors of this invention advantageously provide good corrosion protection at 350° F., demonstrating the value of these inhibitors for high temperature oil and gas well environments. The corrosion inhibition of the organic carboxylic acid derivatives of the amine/acrolein oligomers is surprisingly high as compared to commercially available corrosion inhibitors (Corban A-163 and Textamine T5D) and the corrosion inhibitors in U.S. Pat. Nos. 2,643,977 and 4,315,087.

ZINC/CALCIUM BROMIDE CLEAR BRINE FLUIDS TESTING, 250° F. (121.11° C.)

EXAMPLE 45

Corrosion inhibition of the salt of Westvaco dicarboxylic acid with ethylenediamine/acrolein oligomers prepared in Example 29 was determined under conditions which simulate conditions that exist in oil and gas wells where dense clear brine fluids are used as completion and workover fluids. The inhibitor was weighed into a 4-ounce glass bottle and then 119 grams of 19.3 pound/gallon zinc bromide-calcium bromide solution was added. The bottle was capped and heated at 250° F. (121.11° C.) with shaking to disperse or dissolve the inhibitor. Then a cleaned weighed coupon (25/16"×15/16"×5/32", 39.69 mm×23.81 mm×3.97 mm) of 2 3/8" o.d. quartered N-80 steel pipe was added and the recapped bottle placed in an oven for 168 hours (604,800 s) at 250° F. The coupons were removed from the bottle, cleaned in 5% hydrochloric acid inhibited with 0.1% A-120 for ten minutes (600 s), scrubbed, rinsed and dried with acetone. A-120 is a commercial acid stimulation corrosion inhibitor available from Dowell Schlumberger. The corrosion rate was calculated in milliinches per year (mpy) by using the following formula:

$$mpy = 96.89 \times (\text{gram weight loss of coupon})$$

The percent protection was calculated by using the same formula as in the 175° F. corrosion test. The corrosion protection provided by Example 29 in the zinc bromide-calcium bromide clear brine fluid test procedure at 250° F. (121.11° C.) is given in Table V.

TABLE V

| Inhibitor Sample | Concentration (ppm) | Weight Loss (grams) | Corrosion Rate (MPY) | % Protection |
|---|---|---|---|---|
| None* | 0 | 1.0957 | 172.0 | 0 |
| Ex. 29 | 4800 | 0.2737 | 43.0 | 75 |

*Not an example of the present invention

The data in Table V demonstrates the brine soluble inhibitors of this invention are suitable for the protection of metal alloys against corrosion in dense clear brine fluids used as completion and workover fluids in oil and gas wells.

HYDROCHLORIC ACID STIMULATION TESTING, 175° F. (79.4° C.)

EXAMPLE 46

Corrosion inhibition of various samples was determined under conditions which simulate conditions that exist in oil and gas wells during acid stimulation of a rock formation. Metal coupons of 1010 carbon steel were acidized with 18.5% hydrochloric acid, washed and dried. Two-tenths of a percent of the inhibitor, coupon and 100 grams of 10% hydrochloric acid were added to a test tube which was placed in one-liter Parr bomb and heated for 6 hours at 175° F. (79.4° C.). The coupon was removed from the Parr bomb, cleaned with 18.5% hydrochloric acid which was inhibited with A-120, washed and dried. The corrosion rate in milliinches per year (mpy) and percent protection were calculated using the same equations as in the 175° F. corrosion tests. The corrosion protection provided by Examples 2, 4 and 30 through 40 by the hydrochloric acid stimulation test procedure at 175° F. (79.4° C.,) are given in Table VI.

TABLE VI

| Test | Inhibitor Sample | Concentration (ppm) | Weight Loss (grams) | Corrosion Rate (MPY*) | % Protection |
|---|---|---|---|---|---|
| A | None* | 0 | 7.6899 | 16,063 | 0 |
|   | Ex. 30 | 2000 | 0.7637 | 1,595 | 90 |
| B | None* | 0 | 8.3323 | 17,404 | 0 |
|   | Ex. 31 | 2000 | 0.5388 | 1,125 | 94 |
|   | Ex. 32 | 2000 | 0.6100 | 1,274 | 93 |
| C | None* | 0 | 8.2214 | 14,310 | 0 |
|   | Ex. 33 | 2000 | 0.7697 | 1,339 | 91 |
|   | Ex. 34 | 2000 | 0.6239 | 1,085 | 92 |
| D | None | 0 | 7.8649 | 13,690 | 0 |
|   | Ex. 2 | 2000 | 0.4703 | 818 | 94 |
|   | Ex. 37 | 2000 | 0.3952 | 687 | 95 |
|   | Ex. 4 | 2000 | 0.7166 | 1,247 | 91 |
|   | Ex. 40 | 2000 | 0.4404 | 766 | 94 |
| E | None* | 0 | 8.0236 | 13,966 | 0 |
|   | Ex. 36 | 2000 | 0.6107 | 1,062 | 92 |
|   | Ex. 38 | 2000 | 0.4951 | 861 | 94 |
|   | Ex. 39 | 2000 | 0.3326 | 578 | 96 |
| F | None | 0 | 8.3323 | 17,404 | 0 |
|   | A-120[1]* | 2000 | 0.2030 | 423 | 98 |

*Not an example of the present invention
[1]A-120 is a commercial corrosion inhibitor available from Dowell-Schlumberger.

The data in Table VI demonstrates that the corrosion inhibitors of this invention especially those of Examples 37 and 39 provide protection of 10% hydrochloric acid comparable to that provided by commercially available A-120. Therefore, the corrosion inhibitors of this invention are suitable for the protection of metal alloys against corrosion in oil and gas well formations due to acid stimulation chemicals. In addition, the corrosion inhibitors of this invention are suitable for protection of metal alloys during steel pickling operations.

What is claimed is:

1. A new composition of matter which is the reaction product resulting from reacting at a temperature of from about 25° C. to about 250° C. for a time sufficient to complete the reaction as determined by halide or residual acid number titrations, (1) the product resulting from reacting, in the presence or absence of a suitable solvent,
 (A) at least one aliphatic α,β-monoethylenically unsaturated aldehyde having from about 3 to about 6 carbon atoms; and
 (B) at least one organic polyamine represented by the formula

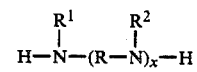

wherein R is a divalent saturated $C_2$ to $C_4$ aliphatic hydrocarbon group; each $R^1$ and $R^2$ is independently hydrogen or a saturated alkyl amino or an alkyloxy group containing from 2 to about 4 carbon atoms or when two adjacent $R^2$ groups are taken together, they form a bridging alkylene radical containing 2 carbon atoms such that the R group containing 2 carbon atoms and two adjacent $R^2$ groups and two nitrogen atoms form a heterocyclic ring containing 4 carbon atoms and 2 nitrogen atoms; x has a value from 1 to about 8 and wherein components (A) and (B) are employed in a mole ratio of (A) to (B) of from about 1:1 to about 1:6; and (II)
 (A) at least one saturated or unsaturated, cyclic or acyclic aliphatic mono- or polycarboxylic acid having from about 2 to about 50 carbon atoms; or
 (B) at least one saturated or unsaturated, cyclic or acyclic aliphatic alkyl monohalide or alkyl polyhalide having from about 2 to about 50 carbon atoms; or
 (C) a combination of (A) and (B);

wherein components (I) and (II) are employed in quantities which provide from about 0.4 to about 1 equivalent of carboxyl and/or halide groups from component (II) for each theoretically active amino hydrogen atom contained in component (I).

2. A composition of claim 1 wherein
 (a) component (II) has from about 12 to about 36 carbon atoms; and
 (b) components (I) and (II) are employed in quantities which provide from about 0.55 to about 0.85 equivalent of carboxyl and/or halide groups from component (II) for each theoretically active amino hydrogen atom contained in component (I).

3. A composition of claim 2 wherein
 (a) component (II) has from about 16 to about 20 carbon atoms; and
 (b) components (I) and (II) are employed in quantities which provide from about 0.65 to about 0.75 equivalent of carboxyl and/or halide groups from component (II) for each theoretically active amine hydrogen atom contained in component (I).

4. A composition of claim 3 wherein (a) component (I-A) is acrolein, crotonaldehyde or a combination thereof;

(b) component (I-B) is ethylenediamine, diethylenetriamine, triethylenetetramine, tetraethylenepentamine, pentaethylenehexamine, hexaethyleneheptamine or any combination thereof; and (c) component (II) is tall oil fatty acid.

5. A composition of claim 1 wherein the reaction product of components (I-A) and (I-B) is an oligomer having an amine hydrogen equivalent weight of from about 50 to about 80.

6. A composition of claim 2 wherein the reaction product of components (I-A) and (I-B) is an oligomer having an amine hydrogen equivalent weight of from about 50 to about 80.

7. A composition of claim 3 wherein the reaction product of components (I-A) and (I-B) is an oligomer having an amine hydrogen equivalent weight of from about 50 to about 80.

8. A composition of claim 4 wherein the reaction product of components (I-A) and (I-B) is an oligomer having an amine hydrogen equivalent weight of from about 50 to about 80.

* * * * *